F. J. HEYBACH.
MACHINE FOR HEADING RECEPTACLES.
APPLICATION FILED JAN. 9, 1913.

1,132,343.

Patented Mar. 16, 1915.
8 SHEETS—SHEET 1.

Fig. 1

Witnesses

Inventor
Frederick J. Heybach,
by James L. Norris
Attorney.

F. J. HEYBACH.
MACHINE FOR HEADING RECEPTACLES.
APPLICATION FILED JAN. 9, 1913.

1,132,343.

Patented Mar. 16, 1915.
8 SHEETS—SHEET 3.

Witnesses

Inventor
Frederick J. Heybach,
by
Attorney.

F. J. HEYBACH.
MACHINE FOR HEADING RECEPTACLES.
APPLICATION FILED JAN. 9, 1913.

1,132,343.

Patented Mar. 16, 1915.
8 SHEETS—SHEET 4.

Fig. 5

Witnesses

Inventor
Frederick J. Heybach,
by
Attorney.

F. J. HEYBACH.
MACHINE FOR HEADING RECEPTACLES.
APPLICATION FILED JAN. 9, 1913.

1,132,343.

Patented Mar. 16, 1915.
8 SHEETS—SHEET 5.

Witnesses

Inventor
Frederick J. Heybach,
by
Attorney.

F. J. HEYBACH.
MACHINE FOR HEADING RECEPTACLES.
APPLICATION FILED JAN. 9, 1913.

1,132,343.

Patented Mar. 16, 1915.
8 SHEETS—SHEET 6.

Fig. 7

Witnesses

Inventor
Frederick J. Heybach,
by
Attorney.

F. J. HEYBACH.
MACHINE FOR HEADING RECEPTACLES.
APPLICATION FILED JAN. 9, 1913.

1,132,343.

Patented Mar. 16, 1915.
8 SHEETS—SHEET 7.

Inventor
Frederick J. Heybach

UNITED STATES PATENT OFFICE.

FREDERICK J. HEYBACH, OF BALTIMORE, MARYLAND, ASSIGNOR TO THE UNIT WEIGHING AND PACKING SYSTEM, (INCORPORATED,) OF BALTIMORE, MARYLAND, A CORPORATION OF DELAWARE.

MACHINE FOR HEADING RECEPTACLES.

1,132,343.     Specification of Letters Patent.     Patented Mar. 16, 1915.

Application filed January 9, 1913. Serial No. 741,073.

*To all whom it may concern:*

Be it known that I, FREDERICK J. HEYBACH, a citizen of the United States, residing at Baltimore city, in the State of Maryland, have invented new and useful Improvements in Machines for Heading Receptacles, of which the following is a specification.

My present invention relates to improvements in machines for beading or otherwise fastening the heads, either the tops or the bottoms, to receptacles, and the primary object of the invention is to provide an improved machine of this character which is operative automatically to feed the heads and the receptacle bodies to the point where the heads are to be applied, which applies the heads automatically to the receptacle bodies, and which thereupon operates automatically to bead the head on the receptacle body, the latter with the head beaded thereon being then automatically removed from the beading position preparatory to the positioning of another receptacle body.

In the preferred embodiment of the invention, a plurality of units are used which operate concurrently to bead a number of receptacles, and in order to avoid excessive load upon the machine the beading devices for the several units may be set into operation successively, thereby distributing the load upon the machine.

To these and other ends, the invention consists in certain improvements, and combinations and arrangements of parts, all as will be hereinafter more fully described, the novel features being pointed out particularly in the claims at the end of the specification.

In the accompanying drawings.

Similar parts are designated by the same reference characters in the several views.

The present invention contemplates applying heads, and particularly caps, to receptacles and fastening such heads or caps thereon by a beading, crimping or analogous operation, and it is to be understood that modifications may be made readily by those skilled in the art to adapt the machine to perform the desired operation according to the character of receptacle used and to the particular mode of fastening or securing the head or cap thereto.

The preferred embodiment of the machine is shown in the accompanying drawings, and in this particular example of the invention the machine is adapted to apply and secure metallic heads or caps to receptacle bodies composed of paper, the heads or caps having flanges which telescope over the ends of the receptacle bodies and are beaded or crimped in such a manner as to form a tight closure or joint and to secure them firmly to the receptacle body. While the invention is not limited necessarily to the particular construction shown which, as stated, is adapted to apply caps or heads to receptacles of the type described, the present embodiment of the invention, the scope of which will be determined by reference to the claims at the end of the specification.

In the present instance, the machine embodies a suitable frame 1 having a table 2 which supports a suitable number of runways or tracks 3 along which the receptacle bodies are fed to and beyond the beading point. In the present form of the invention, the machine embodies a plurality of units which are capable of operating concurrently, the number of units being determined according to the desired capacity of the machine. These units, as shown in the present instance, may be of duplicate construction, each being provided with a track or runway for the feeding of the receptacle bodies to and from the same, and a chute 4 is provided for each unit whereby heads or caps are fed thereto at appropriate intervals.

Figure 13:
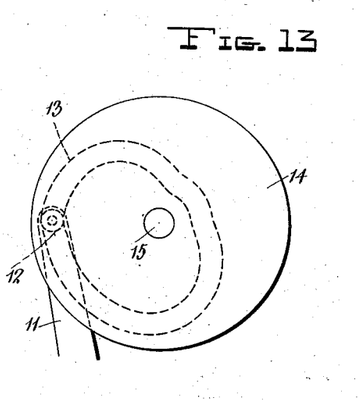
Fig. 13 is a detail view of the cam which serves to reciprocate the mechanism which feeds and positions the receptacles.

The receptacle-feeding mechanism comprises in the present instance a frame 5 which is supported and guided for reciprocatory movement in a direction longitudinally of the runways 3 by the parallel longitudinal bars 6, these bars coöperating toward their rear ends with brackets 7 which are secured to the stationary frame, and the forward ends of these bars operate longitudinally through bearings 8 which are secured to the under side of the table 2. The bars 6 are reciprocated through the medium of the frame 5, which connects these bars, and the frame is operatively connected to a pair of arms 9 both of which are fixed to a rock shaft 10, the latter being journaled at its ends in the sides of the frame. The rock shaft 10 has an arm 11 fixed thereto near the middle, and this arm is provided with a roller or projection 12 which operates in the groove or cam track 13 formed in the cam 14, the latter being shown in detail in Fig. 13 and is fixed to the cam shaft 15, this cam shaft being journaled in the sides of the frame and during operation of the machine it revolves continuously. In the present instance, the cam shaft is driven from the pulleys 16 by gearing 17. The number of reciprocatory bars 6 employed corresponds to the number of tracks along which the receptacles are to be fed, and these bars serve to advance the receptacles along the respective tracks. For this purpose, each bar has a pair of fingers 18 and 19 fixed thereto, these fingers being spaced in a direction longitudinally of the respective bar a distance corresponding to the desired spacing of the receptacles along the track, and these fingers overhang the track while the receptacles are being advanced and are carried clear of the track while the fingers are being retracted preparatory to the engagement thereof with another pair of receptacles before the beginning of the next advancing operation. In order to move the fingers 18 and 19 alternately into positions to engage and to clear the receptacles, the bars 6 carrying the respective pairs of fingers are rotatable, and suitable means is provided for operating them whereby the fingers on all the bars will overlie the tracks during the advancing movement of the frame and will be clear of the tracks and the receptacles thereon during retraction or the return stroke of the frame. In the construction shown, the bars 6 have cranks 20 fixed thereto, and these cranks are connected by a bar 21 which serves to rock or rotate the bars 6 simultaneously and in unison. Different means may be provided for rocking the bars 6 to control the action of the fingers 18 and 19 with respect to the receptacle bodies, a cam 22 being used in the present instance which is fixed to the cam shaft 15 and has a cam track or groove 23 in which a roller or projection 24 operates, this roller or projection being connected to a slide 25 which is movable vertically in a guide 26 fixed to the stationary side frame of the machine, and the upper end of the slide carries a track 27 having parallel upper and lower flanges 28. This horizontal track 27 is of a suitable length as compared with the range of reciprocating movement of the frame 5 and it coöperates with a roller or projection 29 which is attached to a bell-crank 30, this bell-crank being pivoted at 31 on the reciprocating frame 5 and is operatively connected by a link 32 to the bar 21.

When the frame 5 is reciprocated in a direction to advance the receptacles along their respective tracks, the track 27 is in its lower position, the fingers on the bars 6 being then in position to engage the receptacles and advance them. After the advancing movement of the frame 5 has been completed, the cam 22 operates to elevate the track 27 to its upper position, the bars 6 being thereby rotated to withdraw the fingers from position above the tracks, and during the following return stroke of the frame 5 these fingers will pass freely by the receptacles without engaging them. When the return stroke of the frame 5 has been completed, the cam 22 returns the track 27 to its lower position and the fingers 18 and 19 are thereby returned to positions above the respective tracks preparatory to the next advancing movement of the frame. This frame just described serves in the present instance to position the receptacle in each track at the head-applying and beading point and also to remove the previously beaded receptacle from the beading position. A revoluble support or head 33 is located in each track at the head-applying and beading point, each support or head having a stem 34 which is journaled to revolve in a bearing 35, and this support or head is held yieldably in a position where its top surface normally lies flush with the surface of the track along which the receptacles are advanced. A buffer 36 is in the present instance provided for each support or head, the buffer shown having a head 37 which is held yieldably in elevated position by a compression spring 38 and is adapted to sustain pressure applied by the receptacle to the head or support 33, a pin 39 operating in a slot 40 of the head 37 and thereby limiting the movement of the support 33 as well as insuring proper positioning of the top surface of this support with respect to the surface of the corresponding track. A conveyer is used to conduct away from the different tracks the headed receptacles, the conveyer shown embodying a traveling belt 41 which operates between the guides 42 in a direction transverse to the lengths of the tracks and across the ends thereof, it being understood that a row of headed receptacles are simultaneously removed from the head-applying and beading position to the conveyer at each advancing operation of the frame 5.

The heads or caps which are to be applied to the receptacles are fed by the chutes 4 under the control of escapements, there being one chute and one escapement for each unit. Each escapement in the present instance embodies a pair of fingers 43 and 44 which are spaced in a direction longitudinally of the respective chute and are movable in reverse directions transversely of the chute whereby one head or cap is delivered from each chute at each operation. Preferably, the fingers 43 for all the escapements are fixed to a slide bar 45 while all the fingers 44 for the escapements are fixed to a parallel slide bar 46, these slide bars being connected to reciprocate simultaneously in reverse directions by a cross lever 47 which is fixed to the upper end of a rock shaft 48, this rock shaft being mounted in suitable bearings in the stationary frame of the machine and has a slotted arm 49 fixed to its lower end, the slotted end of this arm cooperating with a roller 50 which is attached to a lever 51, this lever being fulcrumed at 52 on a stationary bracket 53 and carries a roller or projection 54 which operates in the groove 55 of a cam 56, this cam being fixed to the cam shaft 15 and serving, through the connections described, to actuate the escapements at predetermined intervals to deliver a head or cap from each chute.

A carrier is provided which receives the heads or caps delivered from the different chutes and conveys and applies them to the receptacles positioned on the revoluble supports. This carrier designated 57 reciprocates vertically between the discharge ends of the chutes and the tops of the receptacles, the ends of the carrier in the present instance being formed with slides 58 which operate vertically in slots 59 formed in the sides of the frame. The carrier is provided on its upper side with mouths 60 which correspond in size and shape to the heads or caps and correspond in number to the number of units employed. In order to adapt these mouths to receptacle heads or caps of different sizes, a lining 61 of the desired size may be used. The carrier is also provided with dies or jaws which serve to correctly center the different receptacles beneath the head or cap-receiving mouths and to hold the end of the receptacle in proper shape while the head or cap is being fitted thereto. In the construction shown, complemental die members 62 and 63 are used, these die members being movable toward one another so as to close around the receptacle in order to position the latter and to insure the proper shape thereof while the cap is being applied, and the die members are arranged to separate after the head or cap has been applied, thereby permitting the beading operation to be performed. It is preferable to connect all of the members 62 of the different dies to a sliding frame 64 and all of the die members 63 to a sliding frame 65, these two frames being suitably guided on the carrier 57, and appropriate means is provided to reciprocate the frames simultaneously in reverse directions to close and open the dies at appropriate intervals. In the present instance, a lever 66 is pivoted at 67 to the carrier and the opposite ends of this lever are connected by the links 68 and 69 to the frames 64 and 65 respectively, the pivot 67 on which the lever 66 is mounted having an arm 70 fixed thereto, and this arm 70 has a roller and fork connection with an arm 71, the latter being fixed to the same shaft 48 which serves to operate the escapements.

In order to support the heads or caps in the mouths 60 while the carrier is moving from the chutes to the receptacle, each mouth is provided with a device which in the construction shown embodies an arm 72 which is pivoted at 73 on the carrier and is provided with a suitable number of fingers 74 which are arranged to operate through openings in one side of the head-receiving mouth and assume a position therein where such fingers will intercept and support the head or cap until such fingers are withdrawn, withdrawal of the fingers taking place after the carrier has descended into engagement with the upper ends of the receptacles. Different means may be provided for operating the arms 72, a reciprocating bar 75 being provided in the present instance which serves to operate all of the arms 72 for the different units, this bar having roller and fork connections with arms 76 which latter are fixed to the arms 72, and the bar 75 which is suitably guided to reciprocate on the carrier is operated at appropriate intervals by a bell-crank 77 which latter is pivoted to the carrier at 78 and has a roller or projection 79 arranged to operate in a cam groove 80 formed in the cam 81, the latter being bolted or otherwise fixed to the side of the machine. The shape of the cam groove 80 is such that the fingers 74 will be moved into the different head or cap-receiving openings when the carrier 57 rises to receive heads or caps from the chutes and during the descent of the carrier, and when the latter approaches or substantially reaches the tops of the receptacles the fingers 74 are retracted, thereby permitting the heads or caps to drop through the mouths and the dies and to rest upon the tops of the respective receptacles.

Figure 1:
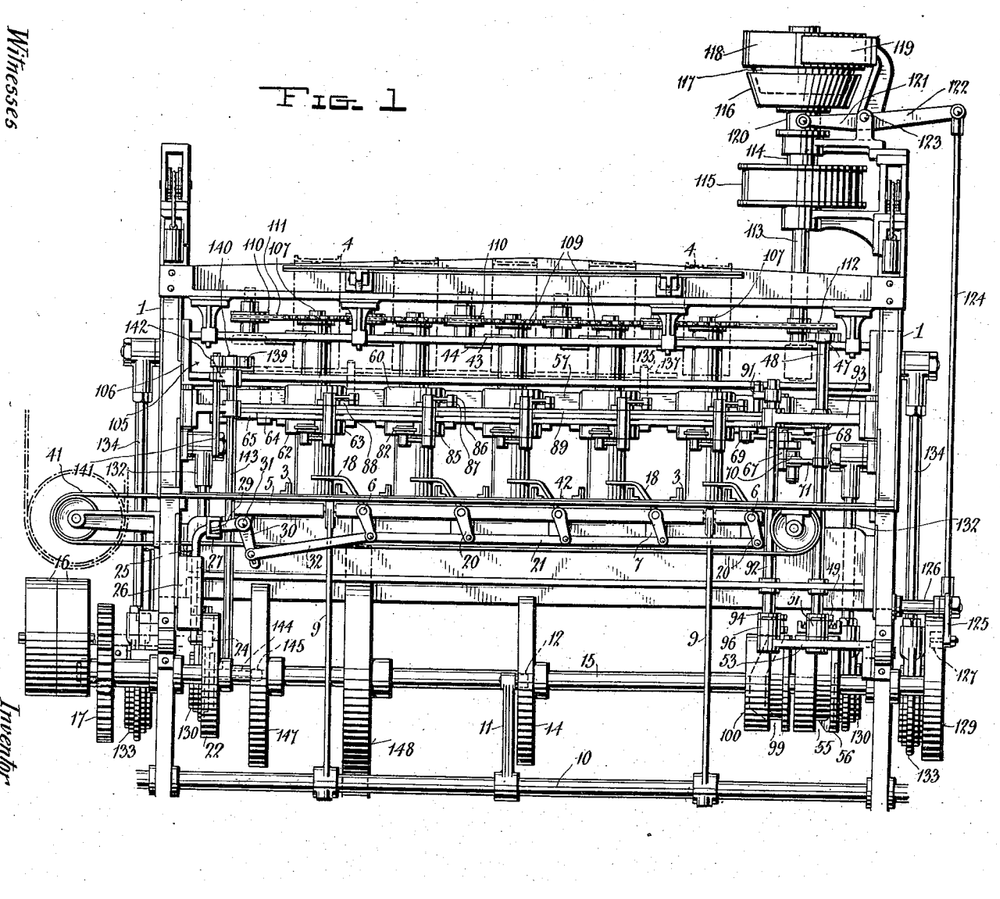
—Figure 1 is a side elevation of a beading machine constructed in accordance with the preferred embodiment of my invention.
Figure 2:
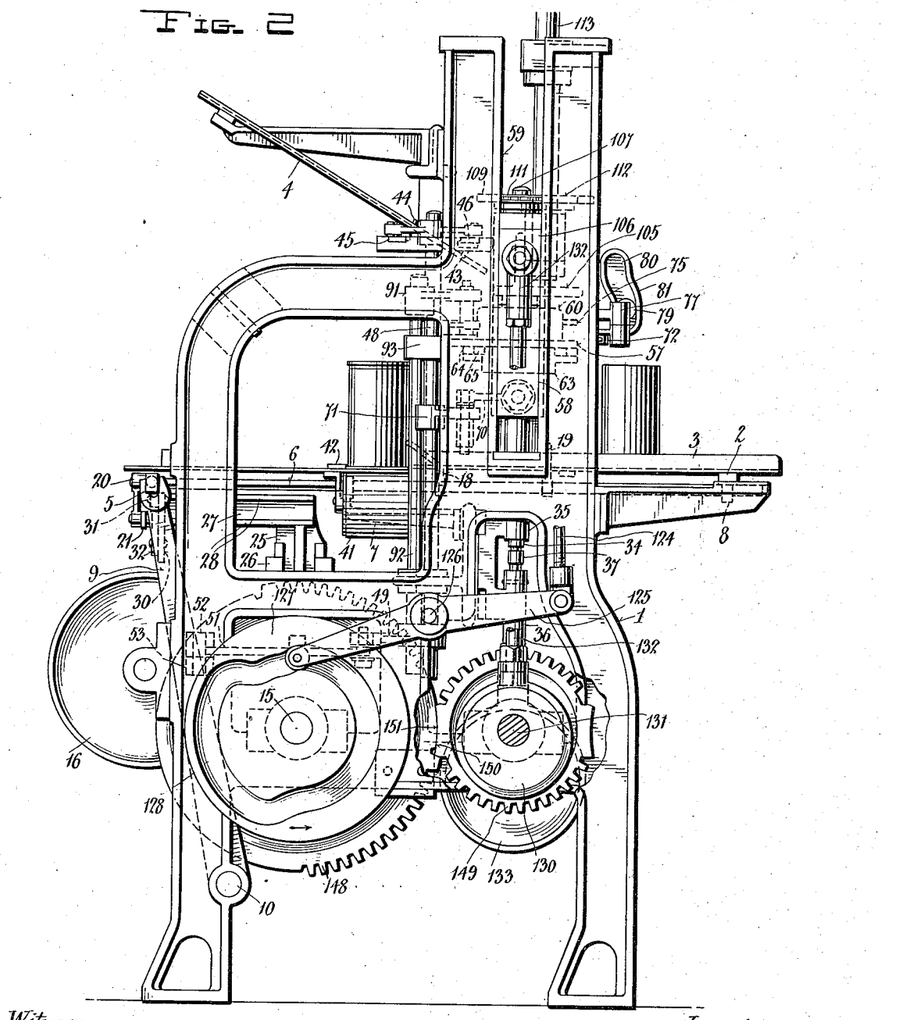
Fig. 2 is an end elevation of the machine as shown in Fig. 1.
Figure 3:
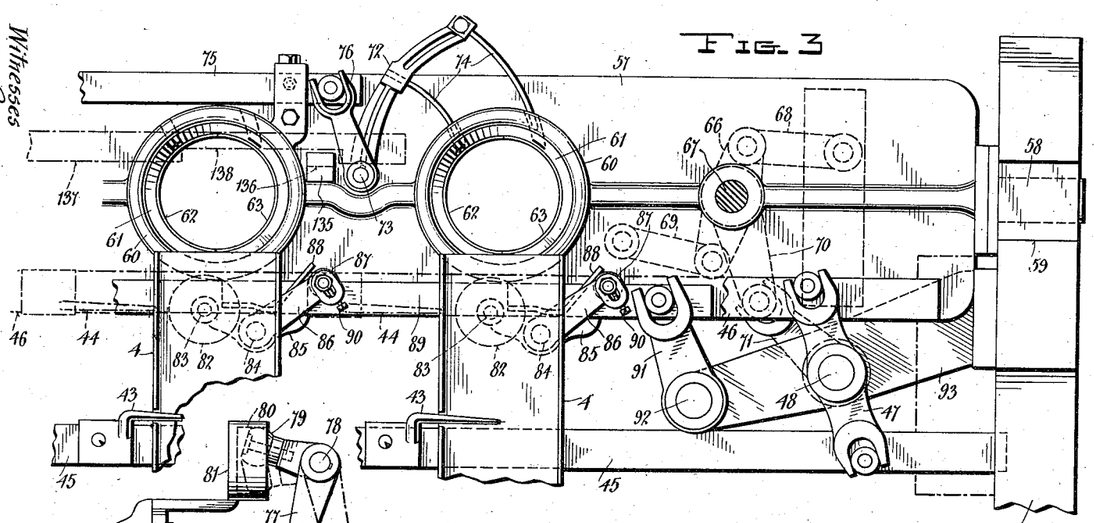
Figs. 3 and 4 are top plan views of portions of the carrier which applies the heads or caps to the receptacle bodies.
Figure 4:
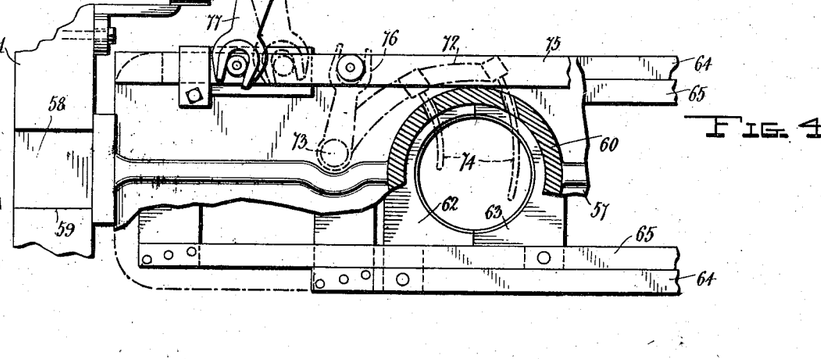
Figure 5:
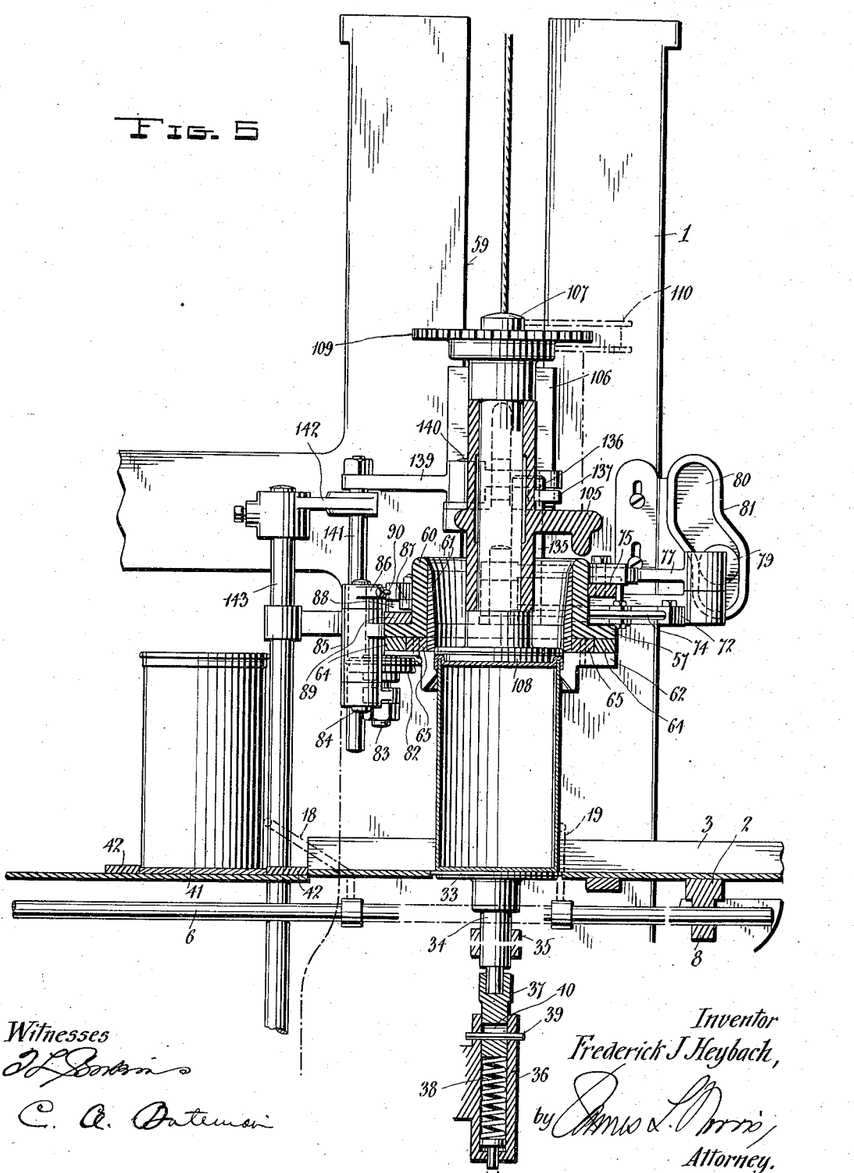
Fig. 5 represents a central vertical section through one of the beading units, a receptacle body being shown in beading position with a head or cap applied thereto.
Figure 6:
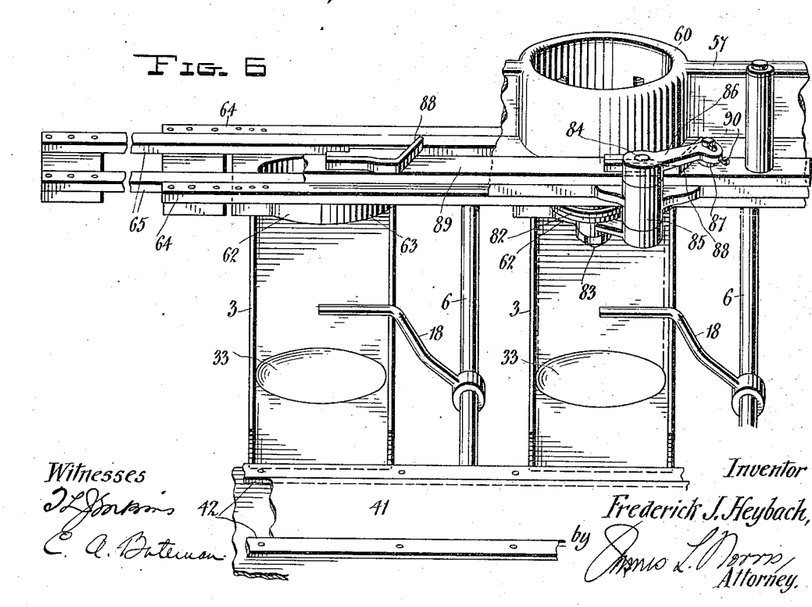
Fig. 6 is a perspective view showing one of the beaders and the means for setting the same into operation.
Figure 7:
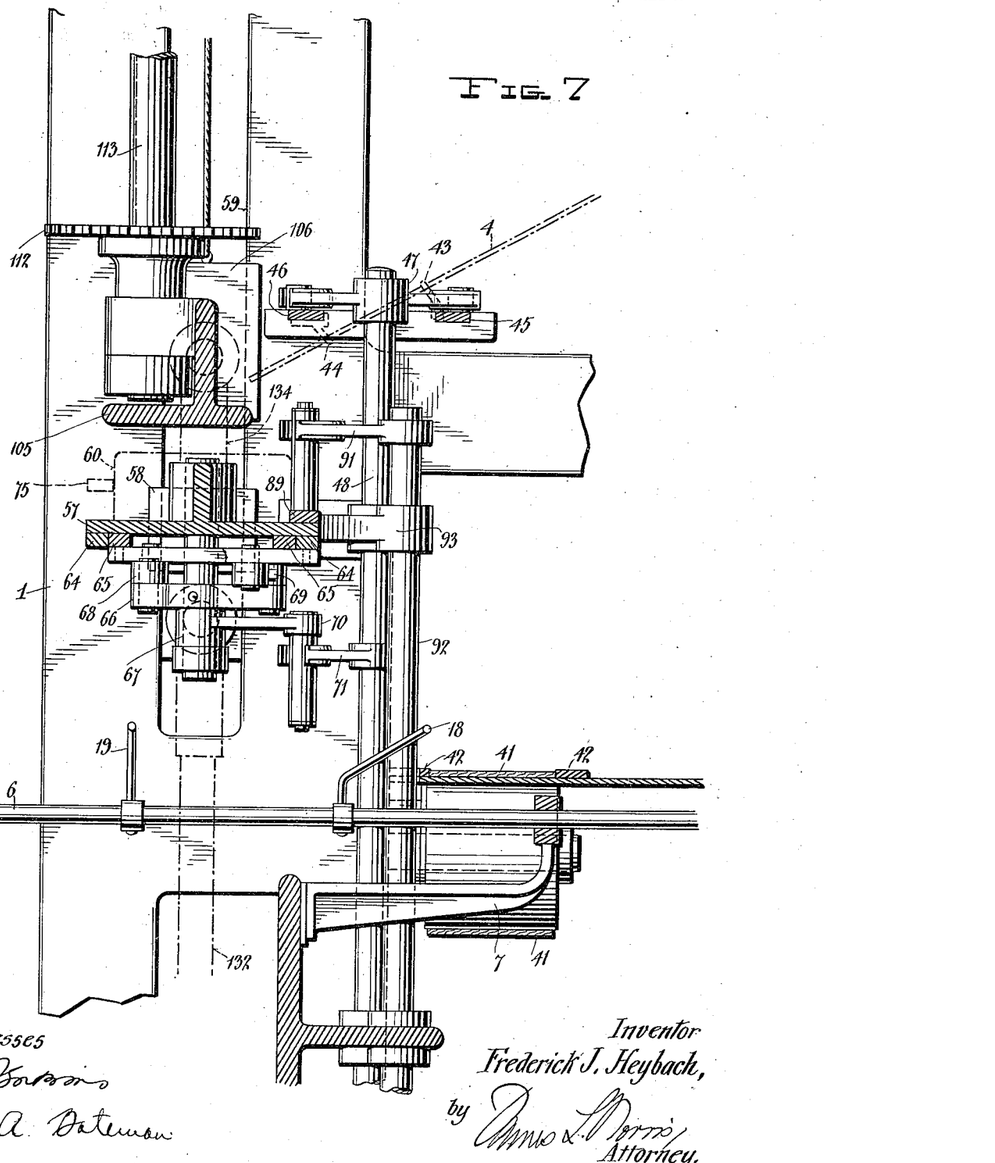
Fig. 7 represents a vertical section of a portion of the machine showing the operating connections for the head-feeding escapements for the cap or head-applying dies or jaws, and for the beaders.
Figure 8:
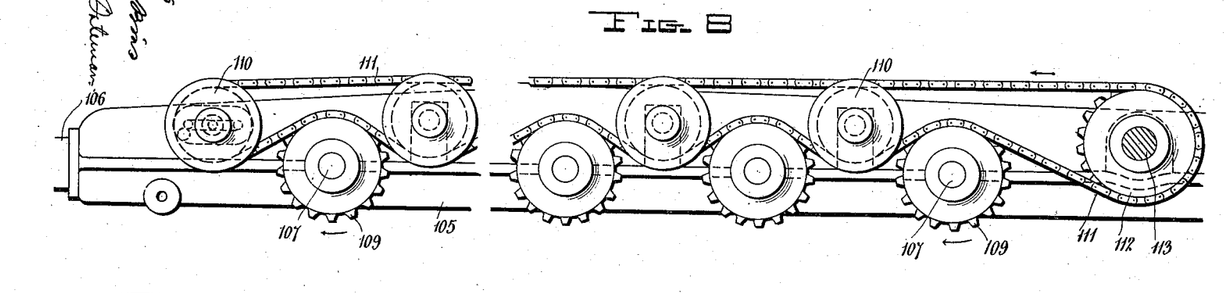
Fig. 8 is a top plan view of the carrier for the chucks showing the driving means therefor.
Figures 10, 17:
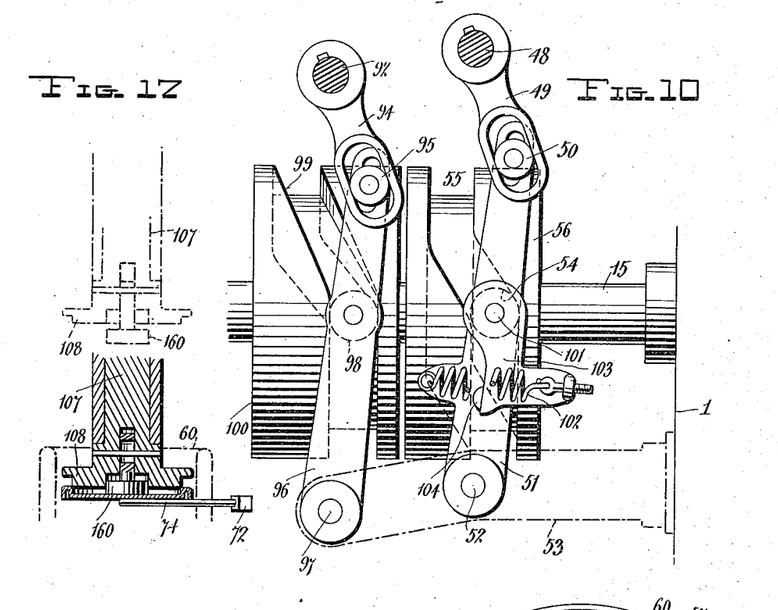
Fig. 10 is a detail view showing the cams which serve respectively to set the beaders into operation and to operate the dies and escapements.
Fig. 17 is a diagrammatic view showing the chuck in elevated position and in a position to engage a head or cap immediately before the latter is applied to the receptacle, the chuck embodying a magnet to which the cap adheres and displacement of the cap is thereby avoided.
Figures 11, 12:
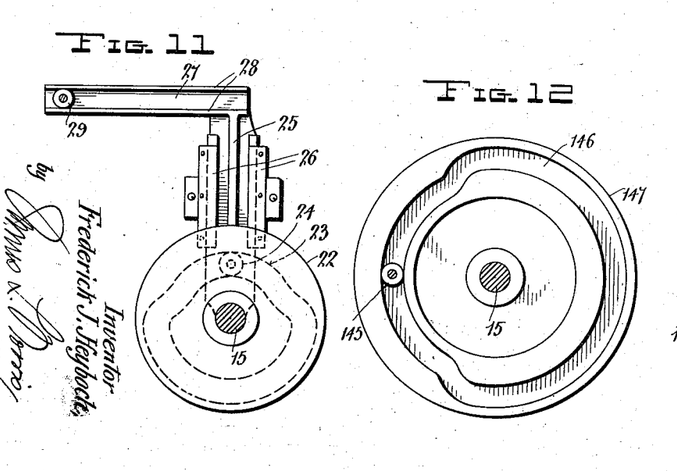
Fig. 11 is a detail view of the cam and coöperative parts for controlling the operation of the mechanism which feeds and positions the receptacles.
Fig. 12 is a detail view of the cam which operates to lock and unlock the carriers.

In the present embodiment of the invention, the heads or caps are secured on the receptacle bodies by a beading action for which purpose each unit of the machine is provided with a beading roller 82 which is journaled on an arm 83 beneath the carrier 57. This arm 83 is fixed to a shaft 84 which is journaled in a bearing 85 fixed to the carrier 57, and the upper end of the shaft 84 has an arm 86 fixed thereto and provided with a roller or projection 87 which is adapted to coöperate with a cam 88, there being one cam for each unit and preferably these cams are all fixed to a common operating bar 89 which is guided to reciprocate longitudinally on the carrier 57 so that movement of the bar 89 in one direction will set the different beaders into operation while movement of said bar in a reverse direction will permit retraction thereof. The different rollers 87 are preferably provided with set screws 90 whereby such rollers may be adjusted to produce the desired amount of pressure on the head or cap during the beading operation, and also it is preferable, in order to avoid excessive strain or load upon the machine, to set the cams 88 differently whereby the beaders will be set into operation successively as the bar 89 is shifted, such a construction being shown, for example, in Fig. 3. Different means may be provided for reciprocating the bar 89 at appropriate intervals, it being understood that the beading rollers 82 are permitted to act on the head or cap through the opening provided by the separation of the dies. In the present construction, an arm 91 is operatively connected to the bar 89, as shown, and is fixed to the upper end of a shaft 92, the latter being journaled in a bearing 93 which also supports the upper end of the shaft 48, and the lower end of the shaft 92 has an arm 94 fixed thereto, the end of this arm being slotted and coöperating with a roller or projection 95 fixed to a lever 96, the latter being pivoted or fulcrumed at 97 on the bracket 53 and bears a roller 98 which operates in the cam groove 99 of a cam 100, the latter being fixed to the cam shaft 15. The arm 96 which serves to control the operation of the beaders may be and is preferably rigid, as shown in Fig. 10, but the arm 51 which serves to operate the dies is preferably composed of yieldably connected sections in order that no part of the machine may be injured should any of the dies be prevented from closing, due to a defective receptacle or other causes, the two sections of the lever 51 in the construction shown being connected pivotally at 101 and a tension spring 102 operates normally to maintain these sections of the lever in fixed relation with the extension 103 of one section abutting against a lug 104 on the other section, the sections, however, bending about the pivot 101 as a center should the shaft 48 encounter abnormal resistance.

During the beading operation, the receptacles with the heads or caps thereon are revolved whereby the beading rollers 82 operate upon the flanges of the heads or receptacles, it being understood that the supports or plungers 33 revolve with the receptacles. According to the present invention, the receptacles are revolved by chucks which pass through the mouths 60 on the cap carrier and bear upon and form a driving connection with the heads or caps, the latter being preferably countersunk at the top to enable the chucks to obtain a gripping hold thereon. In the machine shown, a chuck carrier 105 is provided, the same having slides 106 at the ends thereof which move vertically in the guide slots 59 in the sides of the frame, and this chuck carrier has a set of spindles 107 journaled therein and corresponding in number and arrangement with the mouths for the heads or caps. The lower ends of these spindles have chucks 108 fixed thereto while the upper ends of the spindles are provided with means for revolving them. In the present instance, sprocket wheels 109 are fixed to the spindles, a set of idler wheels 110 are journaled on the carrier 105 in the same plane with the sprocket wheels, and an endless chain 111 coöperates with the sprocket wheels and idler wheels to revolve them in unison. The chain is driven by a sprocket wheel 112 which is mounted on a vertical drive shaft 113, this drive shaft having a sleeve 114 revolubly fitted thereon, the sleeve having a driving pulley 115 fixed thereto and also having a friction clutch member 116 fixed thereto. A complemental clutch member 117 and a brake drum 118 are fixed to the shaft 113, a brake shoe 119 being arranged to coöperate at appropriate times with the brake drum 118 while the sleeve 114 which carries the pulley 115 and the clutch member 116 is provided with a collar 120 with which a fork 121 coöperates, this fork being connected to a lever 122 which is pivoted at 123, and the brake shoe 119 is also fixed to the lever 122. In the construction just described, movement of the lever 122 in one direction will disengage the brake shoe 119 from the brake drum 118 and simultaneously establish a driving connection between the pulley 115 and the drive shaft 113 whereby the latter will be operated, and movement of the lever 122 in a reverse direction will cause disengagement of the clutch members 116 and 117 and will apply the brake 119, thereby arresting quickly the revolving motion of the chucks and the receptacles while the chucks bear on the receptacles, thus preventing overturning or displacement thereof. The lever 122 which operates in the manner described is actuated at appropriate intervals by a rod 124 which is connected to one end of a lever 125, said lever being pivoted at 126 on the frame and its opposite end carries a roller or projection 127 which coöperates with the groove or track 128 in a cam 129, said cam being fixed to the cam shaft 15. The chucks, it will be understood, are in alinement with the openings in the head or cap-receiving mouths 60, and the carriers 57 and 105 descend to apply heads and revolve the receptacles respectively. The reciprocating movements for the carrier 57 are effected by a pair of eccentrics 130 which are fixed to an intermittently rotating shaft 131 which is journaled in the sides of the machine frame, the straps of these eccentrics being connected to said carrier by the links 132. The reciprocatory movements for the chuck carrier 105 are afforded by the eccentrics 133 which are also fixed to the shaft 131 and are connected to the said carrier by the links or rods 134. The eccentrics 130 for the carrier 57 and the eccentrics 133 for the carrier 105 are preferably set at the same angle on the shaft 131, but the eccentrics 133 for the carrier 105 have a greater throw than the eccentrics 130 and the parts are so adjusted that the carriers 57 and 105 will come together when in lowered position and will separate when elevated, thereby permitting a set of caps to be fed to the cap-receiving mouths on the carrier 57. In order to maintain the carriers 57 and 105 in proper relation and to enable the chuck carrier 105 to reinforce the carrier 57 during the beading operation, means is provided for locking these two carriers firmly together when in their lowered position. In the present instance, a suitable number of pins 135 are fixed to one of the carriers, (the carrier 57 in the present instance), such pins having notches 136 in one side thereof while the other carrier 105 has a locking bar 137 mounted to slide thereon, this locking bar having notches 138 which, when opposite to the pins 135, will unlock the carriers and permit separation between them, and when the unnotched portion of the bar 137 is opposite to the pins 135, the two carriers will be locked firmly together. Different means may be provided for reciprocating the locking bar 137 at appropriate intervals, a lever 139 being provided in the present instance which is pivoted at 140 to the carrier 105 and has a vertical rod 141 fixed thereto and extending downwardly therefrom. This rod 141 coöperates with a forked arm 142, the latter being fixed to the upper end of a shaft 143, and said shaft is suitably journaled in the frame of the machine and is provided at its lower end with an arm 144 which latter is provided with a roller or projection 145 which operates in the groove or track 146 of a cam 147, the latter being fixed to the cam shaft 15. The cam shaft 15 in the present instance is adapted to revolve continuously while the shaft 131 revolves intermittently. This result is accomplished by driving the shaft 131 from the shaft 15 through the medium of interrupted gears 148 and 149 which operate on the principle of a Geneva movement, the concave portion 150 of the gear 149 which is concentric with the cam shaft 15 serving to lock the shaft 131 alternately with the carriers 57 and 105 in their uppermost and lowermost positions.

The operation of a beading machine constructed in accordance with the present embodiment of the invention may be briefly described as follows:—The receptacles to be headed or capped are supplied to the different tracks 3 of the machine and also heads or caps are supplied to the chutes 4. Assuming that the carriers 57 and 105 are in their uppermost positions, the fingers 74 will then extend across the openings in the mouths 60, and the escapements are operated to deliver a head or cap to each cap-receiving mouth. During this time the shaft 15 is revolving and the shaft 131 is at rest, the chucks being also inactive. After the heads or caps have been supplied to the carrier 57, the shaft 131 begins its operation, causing the carriers 57 and 105 to descend, the chuck carrier 105 moving at a greater rate than the carrier 57, and when the latter has reached its lowermost position the carrier 105 will have overtaken the carrier 57. As the carrier 57 approaches its lowermost position, the dies 62 and 63, which at this time are closed, pass over the mouths of the respective receptacles, thereby centering the receptacles and insuring a proper shape to the mouth thereof. Immediately after the two carriers have reached their lowermost positions, the cam 147 operates to lock the two carriers together. Also, while the carrier 57 is approaching its lowermost position the cam 81 operates the bar 75 to retract the fingers 74, thereby permitting the heads or caps to fall upon the tops of the respective receptacles. After the two carriers have been locked together in their lowermost position, rotation of the shaft 131 ceases and the dies 62 and 63 are open while the bar 89 is reciprocated to cause the cams 88 thereon to force the beading rollers 82 into operative position. The cam 129 also operates to engage the clutch members 116 and 117 and to disengage the brake shoe 119, thereby setting the chucks into operation, and as these chucks have a driving engagement with the heads or caps and the receptacles to which they are applied, the caps and receptacles will be revolved, and as the beading rollers move into operative position the flanges on the heads or caps will be beaded in such a manner to fasten the caps or heads firmly to the bodies of the receptacles. After the beading operation has been completed, the cam 129 disengages the clutch members 116 and 117 and at the same time applies the brake 119 to quickly interrupt or discontinue the revolving of the chucks and the receptacles. The carriers are unlocked and the shaft 131 is again set into operation whereby the carriers are returned to their uppermost positions, the dies being again closed, and during the upward motion of the carriers the fingers 74 move into the openings in the head or cap-receiving mouths, and after actuation of the escapements to deliver heads or caps to the cap-receiving mouths, the cycle of operations may be repeated. The conveyer 41 may operate continuously to conduct away the receptacles having the heads or caps applied thereto while the frame 5 reciprocates at intervals between the beading operations and while the carriers are above their lowermost positions to remove one set of receptacles from the beading position and to position another set of receptacles at such point.

Figures 9, 14, 15, 16:
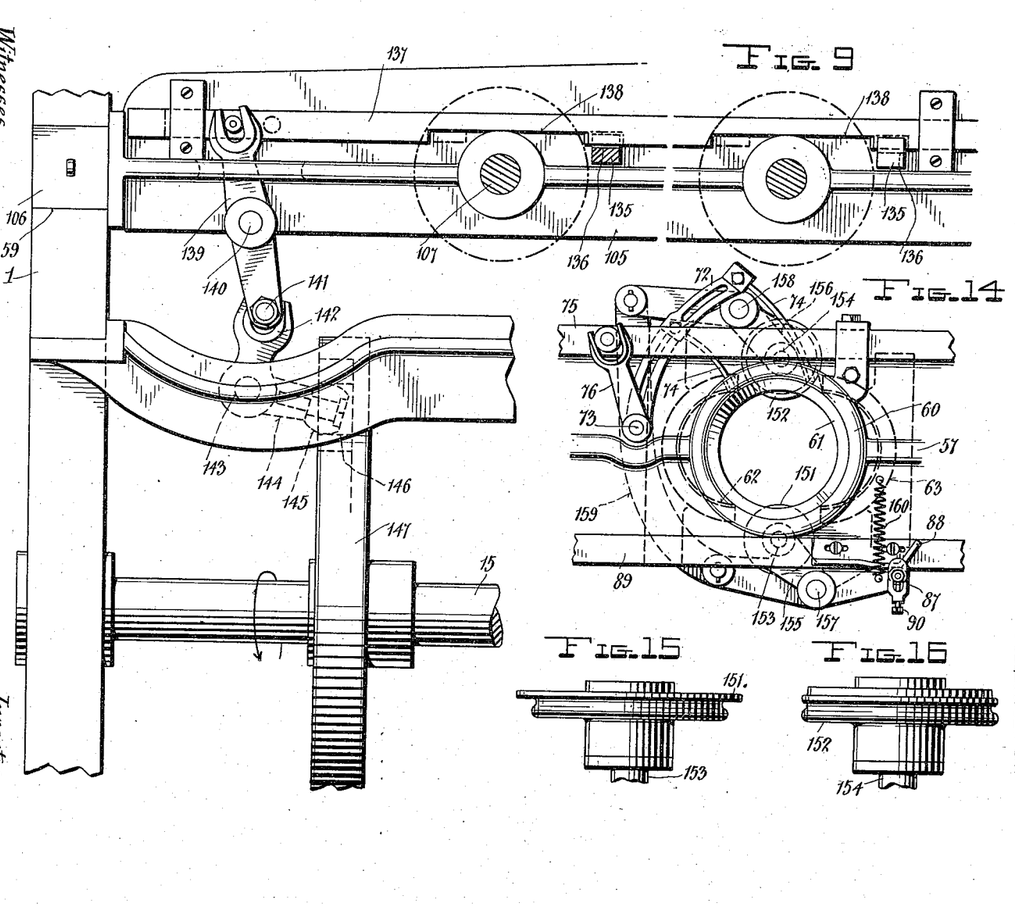
Fig. 9 shows the lock which unites the carriers for the chucks and for the head or cap-applying and beading devices.
Fig. 14 shows the manner in which two beaders may be caused to operate upon each head or cap.
Figs. 15 and 16 are side elevations of a pair of beaders adapted to be used in connection with a double-header arrangement such as that shown in Fig. 14.

Instead of using a single beading roller for each receptacle, as hereinbefore described, a plurality of such rollers may be used, Fig. 14 illustrating a construction which employs a pair of beading rollers 151 and 152, the shafts 153 and 154 of which are supported on levers 155 and 156 respectively, these levers being pivoted to the carrier 57 at 157 and 158 and are operative to move to and from operative position in unison by a link 159. The beading rollers in this construction are adapted to move into coöperative relation with the cap at opposite sides thereof and after the dies 62 and 63 have opened, the dies being preferably operated in the same manner as previously described, and the beaders may also be operated as previously described, that is, the bar may operate so that each cam 88 thereon will actuate both beaders instead of one, as previously. A spring may be employed to retract each pair of beaders.

In order to prevent displacement of the caps, preparatory to the dropping of the same upon the receptacles, it is preferable to provide magnets 160 which are capable of limited vertical movement in the respective chucks 108 whereby these magnets will first engage the caps and will prevent tilting thereof before the caps are engaged by the chucks, thereby insuring proper application of the caps to the receptacles.

I claim as my invention:—

1. In a machine of the character described, the combination of a member movable vertically to apply a head or cap to a receptacle and revoluble to impart rotation to the receptacle, a die embodying relatively separable sections to clamp the end of a receptacle, a mouth also movable vertically for guiding a head or cap to the receptacle, and a device operative during rotation of the receptacle to bead the head thereon.

2. In a machine of the character described, the combination of means for rotatably supporting a receptacle in upright position, a vertically movable member for applying a head or cap thereto and for rotating the receptacle and head, a vertically movable mouth for guiding a head or cap to the receptacle, a split die having means for opening and closing it relatively to one end of a receptacle, a beading device, and means for automatically moving the same to and from operative position relatively to the head on the receptacle.

3. In a machine of the character described, the combination of means for conveying a head to a receptacle, a die embodying relatively separable members adapted to coöperate with and center the receptacle relatively to the head, a chuck for applying the head and for rotating the receptacle with the head applied thereto, and a beader operative on the head during rotation of the receptacle and while the die members are separated.

4. The combination of means for supporting a receptacle, means for applying a head or cap thereto embodying a mouth to receive the head or cap, and a revoluble chuck to engage the head or cap and rotate the same and the receptacle, a die embodying segmental relatively separable members movable toward and adapted to embrace the body of the receptacle and to convey a head thereto, means for automatically separating the die members, and a beader operative upon the head when the dies are separated.

5. The combination of a receptacle support, a carrier movable in a direction toward and from the same and provided with a mouth to receive a head or cap and having relatively separable dies adapted to surround the body of the receptacle, means arranged in said mouth to support a head or cap therein and to deliver the same to the receptacle, and a beader operative on the head when the dies are separated.

6. The combination of a support for a receptacle, means for delivering a head or cap thereto embodying a mouth to receive the same and relatively separable dies to coöperate with the body of the receptacle, a beader operative on the head of the receptacle while said dies are separated, and a revoluble chuck movable through said mouth and engageable with the head to rotate the same and the receptacle.

7. The combination of a receptacle support, feeding means for heads or caps, a carrier reciprocable between said support and feeding means and embodying a mouth to receive a head or cap from the feeding means, devices for supporting the head or cap in said mouth while the carrier is moving toward the receptacle and means for retracting said supporting devices to deliver the head or cap to the receptacle, and a beader mounted on the carrier and operative automatically to bead the head or cap on the receptacle.

8. The combination of a receptacle support, a carrier movable toward and from the same and embodying means for conveying a head or cap to the receptacle, said carrier supporting means for beading the head or cap on the receptacle, and a revoluble chuck also movable toward and from the receptacle support but independently of said carrier and coöperative with the head or cap on the receptacle to revolve the latter during the beading operation.

9. The combination of a receptacle support, a carrier movable toward and from said support and embodying means for delivering a head or cap to the receptacle, and means for beading the head or cap thereon, a second carrier supporting a revoluble chuck adapted to coöperate with the head or cap on the receptacle to revolve the latter, and means for imparting different ranges of movement to said carriers whereby the same will coöperate simultaneously with the receptacle while in one position and will separate while in an opposite position.

10. The combination of means for supporting a row of receptacles, a carrier embodying a set of devices for supplying heads or caps to said receptacles, and devices for beading the heads or caps thereon, a carrier supporting a set of revoluble chucks adapted to coöperate with the heads on the receptacles, and means for locking said carriers together.

11. In a machine for applying heads or caps to receptacles, the combination of a receptacle support, means for feeding heads or caps, a carrier reciprocable between the receptacle support and said feeding means and embodying a mouth to receive heads or caps from said feeding means and to transfer them to a receptacle on said support, fingers movable beyond the center of said mouth to support a head or cap therein, and means operative automatically to withdraw said fingers and to deliver the head or cap to the receptacle during the transferring movement of the carrier.

12. In a machine for applying heads or caps to receptacles, the combination of a receptacle support, means for feeding heads or caps, a carrier reciprocable between said feeding means and receptacle support and embodying a mouth to receive the heads or caps, fingers mounted on the carrier and movable beyond the center of said mouth to support a head or cap therein and withdrawable to deliver the head or cap from the mouth and to deliver the head or cap to a receptacle, and a relatively stationary cam for automatically moving said fingers into and out of operative position during the reciprocatory movements of the carrier.

13. In a machine of the class described, the combination of a receptacle support, a carrier movable toward and from said support to receive and deliver the head or cap to a receptacle thereon, the carrier embodying complemental relatively separable dies adapted to coöperate with the mouth of a receptacle, a beader mounted on the carrier, a revoluble chuck movable to and from operative position relatively to a receptacle on said support, means for automatically separating and closing said dies, and means for automatically moving the beader into coöperative relation with the receptacle and its head while the dies are separated.

14. In a machine of the class described, the combination of means for supporting a plurality of receptacles, a carrier for simultaneously conveying heads or caps to such receptacles, means for applying such heads or caps to the receptacles and for revolving the receptacles with the heads or caps applied thereto, a set of beaders on said carrier, and a member on said carrier for setting the set of beaders into operation.

15. In a machine of the class described, the combination of means for supporting a plurality of receptacles, a carrier operative to apply heads or caps to such receptacles, means for simultaneously revolving such receptacles with the heads or caps applied thereto, a set of beaders adapted to coöperate with the heads or caps of the respective receptacles, and a reciprocatory member on said carrier common to and controlling the operation of the set of beaders.

16. In a machine of the character described, the combination of means for revolubly supporting a plurality of receptacles, means for supplying at one operation heads or caps to said receptacles, means for simultaneously revolving the receptacles with the heads or caps applied thereto, a set of beaders coöperative with the heads or caps of the respective receptacles, and a reciprocatory member operative when moved in one direction to cause operation of the set of beaders and operative when moved in a reverse direction to discontinue operation of the beaders.

17. In a machine of the character described, the combination of means for revolubly supporting a plurality of receptacles, means operative to deliver heads or caps to such receptacles, means for revolving such receptacles with the heads or caps applied thereto, beaders coöperative with the heads or caps of the respective receptacles, and a reciprocatory bar having cams thereon coöperative with the respective beaders for setting the same into operation.

18. In a machine of the character described, the combination of means for revolubly supporting a plurality of receptacles, means for delivering heads or caps thereto, means for revolving said receptacles, beaders coöperative with the heads or caps of the respective receptacles, and means for setting the beaders into operation successively.

19. In a machine of the character described, the combination of means for revolubly supporting a plurality of receptacles, means for supplying heads or caps thereto, means for revolving said receptacles, beaders coöperative with the heads or caps of the respective receptacles, a reciprocatory bar, and differently shaped cams thereon coöperative with the respective beaders for setting the latter into operation in predetermined order.

20. In a machine of the character described, the combination of a receptacle support, means for applying a head or cap to the receptacle embodying dies adapted to close upon the mouth of a receptacle, and means for operating said dies embodying a cam, and a coöperative lever composed of a pair of members pivotally connected at an intermediate point, a device yieldingly retaining said members in normal relation, and a roller or projection on one of said members coöperative with said cam.

In testimony whereof I have hereunto set my hand in presence of two subscribing witnesses.

FREDERICK J. HEYBACH.

Witnesses:
EDWARD P. HILL,
CHARLES L. RUEFFEL.

Copies of this patent may be obtained for five cents each, by addressing the "Commissioner of Patents, Washington, D. C."